United States Patent [19]

Carlsson et al.

[11] 4,181,114

[45] Jan. 1, 1980

[54] CIRCUIT ARRANGEMENT FOR ELECTRONIC IGNITION APPARATUS

[75] Inventors: Hans T. H. Carlsson; Leif B. Gustafsson, both of Amal, Sweden

[73] Assignee: Aktiebolaget Svenska Elektromagneter, Sweden

[21] Appl. No.: 872,129

[22] Filed: Jan. 25, 1978

Related U.S. Application Data

[63] Continuation of Ser. No. 679,795, Apr. 23, 1976, abandoned.

[30] Foreign Application Priority Data

Apr. 25, 1975 [SE] Sweden ............................... 7504829

[51] Int. Cl.[2] ........................ F02P 3/06; H05B 41/14; H02K 21/22

[52] U.S. Cl. ......................... 123/148 CC; 123/149 C; 315/209 CD; 310/153; 310/218

[58] Field of Search ........ 123/148 CC, 148 D, 148 E, 123/149 D, 149 C, 149 A, 149 R; 315/209 SC, 209 CD, 218; 310/153, 156, 70 A, 70 R, 74

[56] References Cited

U.S. PATENT DOCUMENTS

| | | | |
|---|---|---|---|
| 2,443,060 | 6/1948 | Wall | 315/218 |
| 2,710,929 | 6/1955 | Phelon | 310/70 A |
| 2,847,490 | 8/1958 | Phelon | 123/149 D |
| 3,545,420 | 12/1970 | Foreman | 123/148 CC |
| 3,598,098 | 8/1971 | Sohner et al. | 123/148 E |
| 3,667,441 | 6/1972 | Cavil | 123/148 CC |
| 4,019,485 | 4/1977 | Carlsson | 123/148 E |

FOREIGN PATENT DOCUMENTS

| | | | |
|---|---|---|---|
| 2618222 | 11/1976 | Fed. Rep. of Germany | 123/148 CC |
| 2529678 | 1/1977 | Fed. Rep. of Germany | 123/148 CC |

*Primary Examiner*—Charles J. Myhre

*Assistant Examiner*—P. S. Lall

*Attorney, Agent, or Firm*—Hill, Van Santen, Steadman, Chiara & Simpson

[57] ABSTRACT

An electronic ignition system for use with a flywheel having a magnet comprises a unitary core carrying a trigger coil, an ignition coil and a charging coil, the latter being coupled through a charging rectifier and a storage capacitor to the ignition coil, the transient oscillations that are created by sparking discharge being damped in the core portion carrying the ignition coil, and the windings of the ignition coil being so directed and of such number that induced voltages therein fall below the sparking voltage of the spark plug during the flux alternating sequence produced by the passage of the magnetic poles.

5 Claims, 7 Drawing Figures

CIRCUIT ARRANGEMENT FOR ELECTRONIC IGNITION APPARATUS

This is a continuation of application Ser. No. 679,795, filed Apr. 23, 1976, abandoned.

BACKGROUND OF THE INVENTION (a) Field of the Invention

The present invention refers to a circuit arrangement for electronic ignition apparatus.

(b) Prior Art

The requirements which small engines have in common with respect to ignition systems are, apart from the basic requirement that the ignition effect should be sufficiently high over the whole speed range of the engine, that the amount of space occupied should be small, that the weight should be low, and that the useful life and reliability should be high. Further, any necessary service with possible replacement of malfunctioning parts should be able to be carried out quickly and simply. Typical examples where requirements of this kind are particularly important, are chain saws which are nowadays normal working tools for forestry workers and which are in general exposed to heavy operation under difficult working conditions.

The modern electronic flywheel magneto of today is the answer in general to the requirements mentioned, providing its design has been suited to practical requirements while the working conditions required by the electronic components have been met. There remains, however, a continual effort to improve ignition systems, especially the objects of making the systems even more compact and increasing serviceability simultaneously as efficiency and reliability are improved.

Clear tendencies can be observed in this development work. Magnetos with coil systems placed inside the flywheel, with accompanying large flywheel diameter, have been replaced with engines having smaller flywheel diameters and electronic modules placed outside the flywheel, in combination with a separate ignition coil. In such a solution two relatively easily accessible outer components are present, and the flywheel never needs to be interfered with in servicing the system and associated parts. The electronic module comprises a two- or usually three-legged iron core, the poles of which are spaced close to the circumference of the flywheel and which coact with permanent magnet means arranged therein. Two of the iron core legs carry a charging coil and a trigger coil, respectively, and the iron core and the coils, together with remaining electronic parts such as a capacitor, thyristor, necessary diodes and resistors are encapsulated as a unit in a suitable hard plastic, usually epoxy resin, for withstanding moisture and obtaining mechanical strength. The same encapsulating procedure is also applied in general for the separate ignition coil.

SUMMARY OF THE INVENTION

The present invention has an object of further reducing the number of outer components, and this goal requires the use of an ignition coil arranged on the middle leg of a three-legged core, whereby there is only one outer unit. At first sight, the solution may appear simple and self-evident from several points of view. In practice, however, it provides several complicated problems, the solution of which demands quite special measures if the system is to function perfectly and the requirement of lowest possible module volume is to be met at the same time.

The problems are associated with the basic conditions which must always be met in an electronic ignition system, namely that the capactior must have a full voltage charge when ignition takes place, which in turn requires that the thyristor must be able to open without disturbance after its preceding closure due to an impulse from the trigger coil. It is further absolutely necessary to take suitable measures for protecting the electronic components from dangerous transient voltages. (In a separate ignition coil with its own iron core, the capacitor discharge takes place without any mutual induction between the coils of the electronic module and no uncontrollable voltage peaks occur). However, placement of the ignition coil having primary and secondary windings on a leg of the iron core in the module, causes a magnetic coupling in the iron circuits which has the direct result that a magnetic flux, caused by the discharge of the capacitor through the primary winding of the ignition coil, also causes flux variations in adjacent pole legs as well, and induces voltages in associated coils as a consequence thereof. Since the spark voltage in the spark plug can be 25 KV or more, the induced voltages in the charging coil will be very high. Part of the problem that the invention is to solve is thus mastering these transients in such a way that they are utilized in charging the capacitor on the one hand, and on the other hand are rendered harmless to the electronic components.

A further problem occurs in placing the ignition coil on the middle leg, namely that a voltage sequence is generated directly in the ignition coil windings when the magnet system of the flywheel goes past. If an ignition coil were designed according to past practice, the voltage peaks directly induced by the magnets would be so high that they would cause extra and undesirable sparking in the spark plug.

Further in this art, the ignition coil windings are always arranged so that the spark in the spark plug will be negative. With such polarity, the spark jumps from the central electrode over to the side electrode of the plug. The compressed gas in and around the spark plug will then be negatively ionized and an electron migration takes place from the central electrode to the side electrode. The reason for this discharge direction is that the unavoidable erosion then takes place on the central electrode, which is thereby slowly consumed while the side electrode will remain substantially unaltered, and can be tapped in if the electrode gap is too great. This rule with regard to the direction of the spark in the spark plug is also applicable as a basic requirement in the present case.

According to the invention, all the said problems are solved. The ignition coil is placed on the middle leg of a three-legged core. Taken in the direction of rotation of the flywheel, the trigger coil is placed on the first leg and the charging coil on the last leg, while retaining small dimensions for the core. The primary and secondary windings of the ignition coil and the winding of the charging coil all have the same direction; of winding the turns ratio for the ignition coil, i.e. the relationship between the number of turns for the primary coil windings to its secondary coil windings, is so selected that the voltage peaks induced by the rotating permanent magnet field are sufficiently low and are of such polarity that they do not cause extra sparking in the spark plug; further, by means of the previously mentioned winding of the coils in the same direction, the transients induced in the charging coil caused by the capacitor discharge through the ignition coil include a first transient with a very high voltage peak which has a positive polarity and which is fed into the temporarily discharged capacitor and a subsequent transient with a somewhat lower voltage peak having a negative polarity which is led off by a varistor coupled in parallel so that the electronic components are effectively protected.

The distinguishing features of the invention are apparent from the appended claims.

An embodiment according to the invention is described as follows with reference to the appended drawings.

AS SHOWN ON THE DRAWINGS

Figure 1:
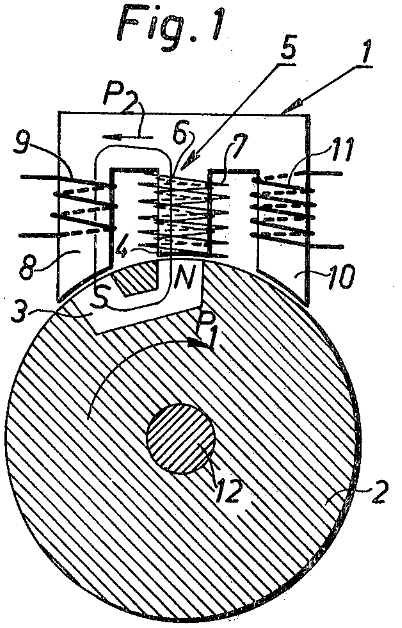
FIG. 1 shows schematically a vertical cross-section through a three-legged core with an ignition coil arranged on a middle leg, a trigger coil and a charging coil being arranged on the side legs, and a flywheel having a two-pole permanent magnet.

In FIG. 1, a three-legged iron core, generally designated 1 is fixedly mounted for co-action with a rotating flywheel 2 having a two-pole permanent magnet 3 arranged at its circumference, the spacing between the poles substantially corresponding to the spacing between the legs of the core 1. On a middle leg 4 of the core 1 there is an ignition coil 5 having a primary winding 6 and a secondary winging 7. On a first outer leg 8 of the core 1 there is a trigger coil 9 and on a second outer leg 10 is a charging coil 11. The flywheel 2 is mounted on an engine shaft 12 for rotation according to the arrow P1, an alternating magnetic field thus passing through the core 1 and generating potentials in the respective coils. For the magnet bit position shown in FIG. 1 there is thus a magnetic field according to the arrow P2 through the legs 4 and 8. The electronic components incorporated in the electronic ignition system are arranged on circuit cards or the like (not shown) and are mounted in direct conjunction with the core 1 along with said coils, and together with these parts are encapsulated in a completely moisture-proof and mechanically strong casing of molded hard plastic, preferably epoxy resin. A unified compact module is thereby accomplished which is simple to fit and easy to exchange.

Figure 2:
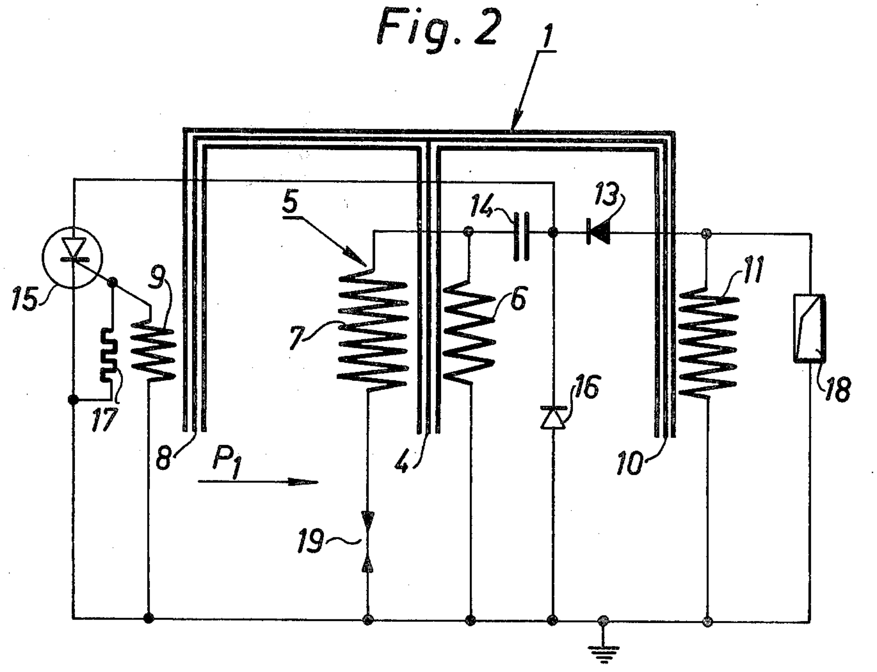
FIG. 2 is a schematic diagram for a complete electronic ignition system according to the invention.

In the circuit diagram according to FIG. 2, the core 1 and its coils are shown connected to the electronic components which make up the system. The direction of movement of the magnet 3 past the legs 8, 4 and 10 is denoted by the arrow P1. A capacitor 14 and a charging diode 13 are arranged in the circuit for the charging coil 11. Between the charging diode 13 and the capacitor 14 a thyristor 15 is connected in parallel with a discharging diode 16 for the capacitor 14, the thyristor and diode being connected to ground. The thyristor 15 is closed on a trigger pulse from the trigger coil 9, a shunt resistance 17 or the like adjusting the trigger pulse to a predetermined level. A varistor 18 (a voltage-dependent resistance) is connected across the charging coil 11. The primary and secondary winding 6, 7 are connected to each other with an autotransformer type connection, and a free output from the secondary winding 7 is connected to a spark plug 19.

Figure 4:
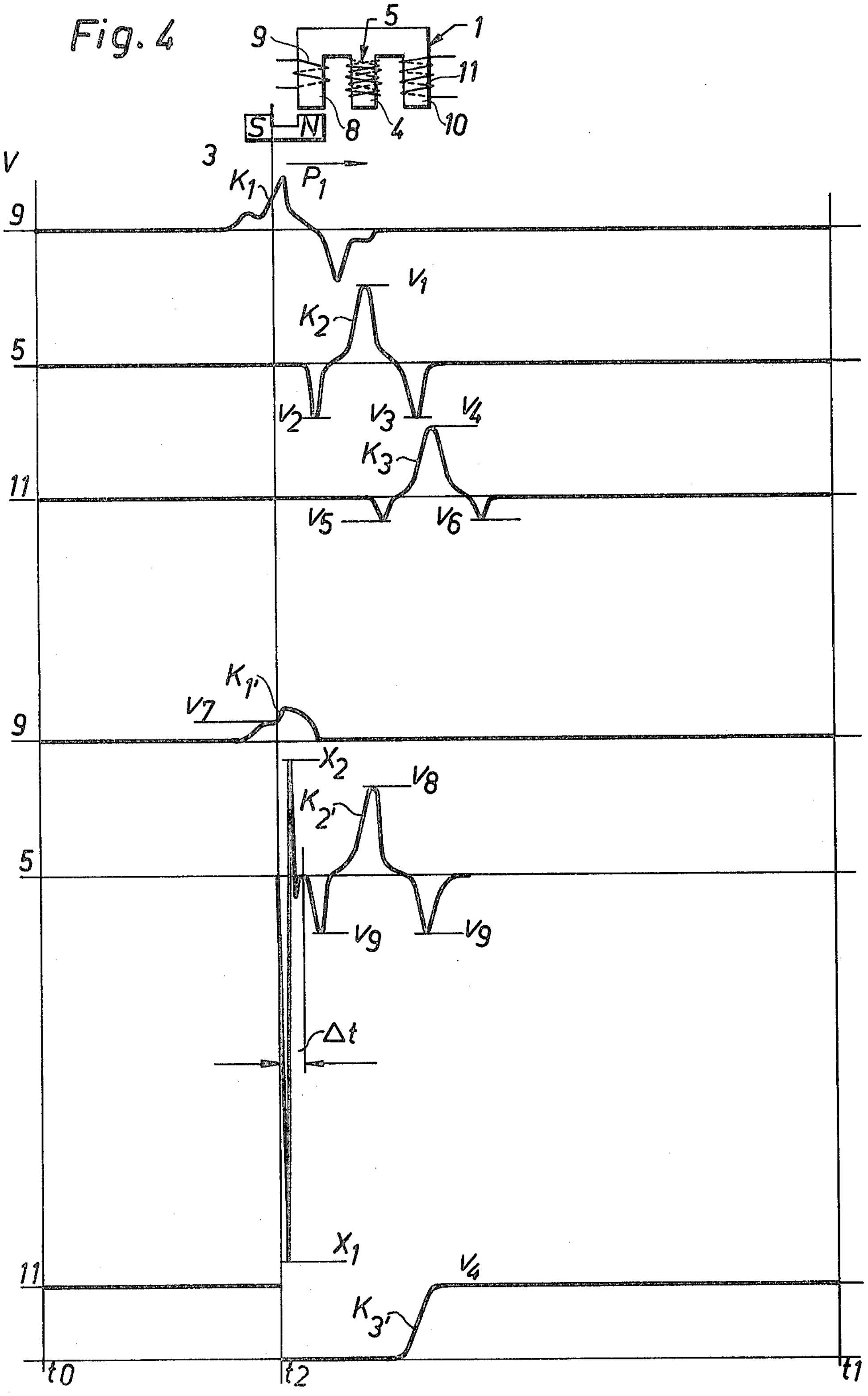
FIG. 4 is a summary in diagram form of the different potential sequences arising in the trigger coil, ignition coil and charging coil without load on the coils and also with normally operationally loaded coils.

FIG. 4 is a diagram showing in summary and in principle the potential circuits of the different coils, when the magnet 3 goes pas the pole legs 8, 4, 10 in the direction of the arrow P1. FIG. 4 is a time-voltage diagram with time as the abscissa and voltage as the ordinate. The time $t_0$–$t_1$ denotes the time for a complete revolution of the flywheel. For the sake of clarity, the different curves are somewhat extended in relation to the time scale and only represent in that respect the mutual relative relationship between the potential sequences. Similarly, the voltage levels shown in the diagram are to be considered as indicative and not as actual. A first group of curves $K_1$, $K_2$, $K_3$respectively represent the voltage sequence in the trigger coil 9, ignition coil 5 and charging coil 11 with no load on the coils, the curves being practically symmetrical about (unmarked) time lines. The curve $K_1$ of the no-load voltage for the trigger coil 9 is substantially symmetrical about the associated abscissa. The curve $K_2$ for the ignition coil 5 represents the generation of a complete flux reversal through the middle leg 4 and shows a high positive voltage peak $V_1$ and two substantially as large, but somewhat lower negative voltage peaks $V_2$, $V_3$. The curve $K_3$ for the charging coil 11 has a positive voltage peak $V_4$ and two substantially lower negative voltage peaks $V_5$, $V_6$. The curves $K_1$, $K_2$, $K_3$, are shown in relative positions to each other which in principle agree with the positional relationship in operation.

A second group of curves $K_{1'}$, $K_{2'}$ and $K_{3'}$ represent corresponding voltage sequences during normal operation of the engine. The curve $K_{1'}$ for the trigger coil 9 has an inflection at a voltage $V_7$ corresponding to the trigger voltage for the thyristor 15 in FIG. 2. As previously mentioned, the voltage $V_7$ is predetermined and adjusted to the closing voltage of the thyristor 15 and thereby also to the moment of ignition $T_2$.

The latter is denoted in the diagram with a time line $T_2$. At the trigger point $T_2$ the thyristor 15 is triggered by the voltage $V_7$ and becomes with the capacitor 14 and the secondary winding 6. In normal operation and when starting the engine, the capacitor 14 is charged by the voltage $V_4$ induced in the charging coil 11 according to the curve $K_{3'}$ and a momentary discharge of the capacitor 14 takes place through the primary winding 6. This primary current induces a high ignition voltage, e.g. 25 KV, in the secondary winding 7 and causes a spark jump in the spark plug 19. The spark is of short duration, but must have a minimum duration to achieve an effective ignition of the compressed fuel-air mixture in the engine cylinder. As an example, a spark time of about 0.2 milliseconds for an engine speed of 3000.

As can be seen from FIG. 2 the charging diode 13 allows only positive voltage pulses from the charging coil 11 to reach the capacitor 14, and the safety diode 16 enables completely emptying the capacitor after each discharge.

As stated above, practical demands presuppose a negative discharge in the spark plug 19, as is principly denoted in FIG, 3. When the spark jumps, electrons being negative migrate from a central electrode 20 to a side electrode 21 according to the arrow P3 simultaneously as an ambient gas concentration 22 becomes negatively ionized.

The curve $K_{2'}$ denotes that the requirement of a negative spark jump has been met, the curve showing a high negative voltage peak $X_1$ just after the trigger point $t_2$, such peak coming up to or above 25 KV. On known electrical principles, the discharge through the ignition coil 5 results in a series of dampened voltage oscillations, of which at least one positive voltage peak $X_2$ reaches a considerable value. Thereafter there is a rapid damping so that after a time $\Delta t$ the ignition voltage is, generally speaking, back to zero. It is thus clear that the sparking sequence in the spark plug 19 takes place within a portion of the time $\Delta t$, and different factors can effect the duration of the spark, e.g. the distance between the electrodes 20,21, the compression in the cylinder, possible deposits on the electrode etc.

After the time $\Delta t$, a voltage sequence occurs in the curve $K_2$, conforming in all essentials to the curve $K_2$. In operation, there thus arises a positive voltage peak $V_8$ and two somewhat lower negative voltage peaks $V_9$. It is therefore extremely important for the proper function of the electronic ignition system that these voltage peaks be controlled in such a way that they do not cause further sparks in the spark plug. As the thyristor 15 acts as an integrated component in the discharging circuit, it is imperative that the voltage according to the curve $K_{2'}$ be kept at zero for a certain time, so that it will open again and thereby block current flow through itself. Otherwise the capacitor 14 will not obtain a full charge from the subsequent charging pulse.

Figure 3:
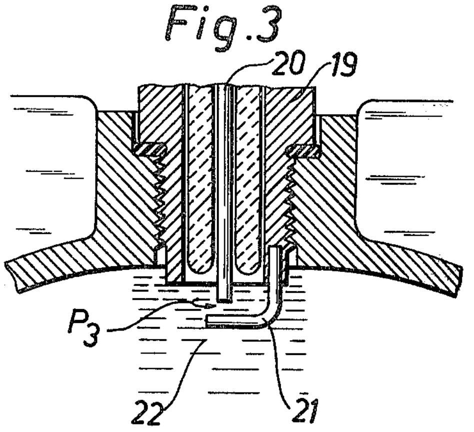
FIG. 3 is a cross-section through an active portion of a spark plug and denotes the direction of the spark jump, with the ionized gas portions around the plug.

Two requirements must be met in order that extra sparks from the voltage peaks $V_8$, $V_9$ will not occur in the spark plug 19: The voltage peaks must not be too high and the greatest voltage peak $V_8$ must be opposite (i.e. positive) to the negative ignition voltage peak $X_1$. The relationship prevailing here is that the negatively ionized gas mixture 22 in FIG. 3 offers resistance to a spark in a positive direction (the voltage peak $V_8$). Thus the negative voltage peaks $V_9$ can be permitted to attain about 2 KV in practice, i.e. a voltage at which there is no risk of sparking in spite of the negative sign, whereas the positive voltage peak $V_8$, because of its polarity, can be allowed to attain 4.5 to 5 KV without any extra sparking occurring. These obtained as explained in the following description. The charging voltage from the charging coil 11 to the capacitor 14 should not exceed 425 volts for the electronic components selected for this type of ignition system.

Figure 5:
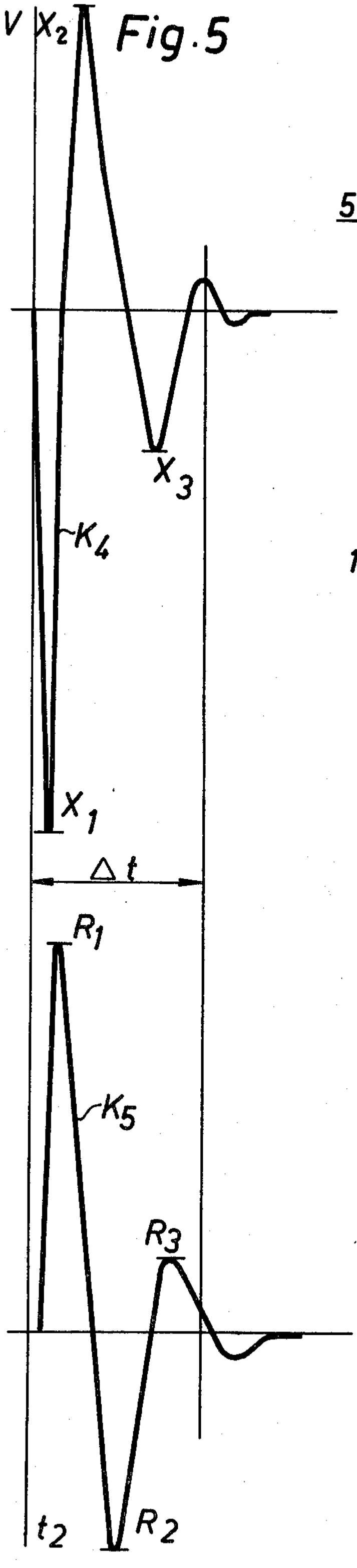
FIG. 5 in an enlarged scale is a diagram of the potential sequence through the secondary winding of the ignition coil and the spark gap of the spark plug for a spark jump, and in connection herewith a diagram of the transients arising in the charging coil due to induction from the ignition coil.

Very high induced transient voltages occur in the charging coil 11 when the spark occurs, i.e. when the capacitor 14 is discharged, due to the magnetic coupling between the ignition coil 5 and the charging coil 11, these transients being completely separate from the voltage sequences generated by the passing magnetic field from the permanent magnet 3. The relation between the ignition voltage sequence and these transients is schematically illustrated by the diagram in FIG. 5, where time is the abscissa and voltage the ordinate. Uppermost in FIG. 5 there is shown a curve $K_4$ which is an enlargement of a first portion of the curve $K_{2'}$in FIG. 4, and substantially comprises the voltage sequence or sparking phase during the time $\Delta t$. The curve $K_4$ has thus the negative ignition voltage peak $X_1$ and the subsequent positive voltage peak $X_2$, and as an example a further subsequent negative voltage peak $X_3$. The time $\Delta t$ and the trigger point $t_2$ are also noted. A lower curve $K_5$ in FIG. 5 represents the transients which are induced in the charging coil 11 during the ignition sequence, due to the magnetic coupling between the middle leg 4 and the second side leg 10 of the core 5.

Figure 6:
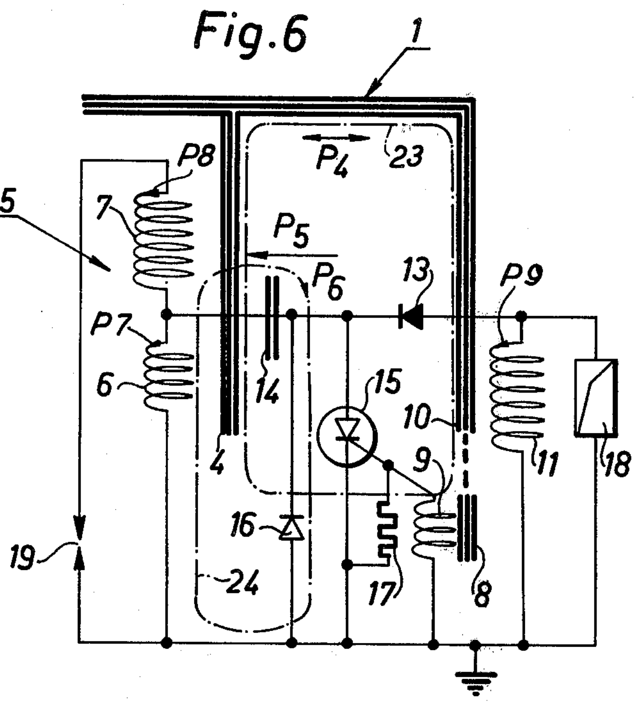
FIG. 6 is a somewhat clarified circuit diagram of FIG. 2 and shows particularly a single direction of winding the primary and secondary windings of the ignition coil and the charging coil and the current directions in charging and discharging a capacitor incorporated in the system.

In the circuit diagram of FIG. 6, which reproduces the diagram of FIG. 2 in a clarified manner, the magnetic field arising at the moment of sparking is denoted by a line 23 and a double arrow P4. The current direction during charging the capacitor 14 is denoted by an arrow P5, the discharging direction and the circuitry of the discharging current being respectively denoted by an arrow P6 and a dashed line 24. The other electrical and electronic components of the diagram of FIG. 2 are reproduced in FIG. 6.

The polarities or signs of the transients according to the curve $K_5$ are determined by the polarities of the magnetic field 23 in FIG. 6, i.e. by the relationship between the winding direction for the primary winding 6 on the one hand, and for the secondary winding 7 in the ignition coil 5 and the charging coil 11 on the other hand. In other words, the winding direction for the coils can be selected to effect a desired transient direction. The transients according to the curve $K_5$ are the same in number as the voltage peaks according to the curve $K_4$ and the size of the transients is proportional to the values of said voltage peaks.

Every positive transient is applied directly to the capacitor 14 via the diode 13, completely discharging the capacitor in conjunction with the spark. Thus a positive transient contributes to charging the capacitor and can be very high without risk of damage to the electronic components. On the other hand, a negative transient must be kept under control with regard to the peak inverse voltage of the diode 13.

These conditions lead to the following considerations and measures. A first transient $R_1$, in curve $K_5$ caused by the high spark voltage $X_1$ must have a positive sign. Then all the energy from the transient $R_1$ will be applied to the capacitor 14 via the diode 13 and contribute to its charge. An immediately subsequent second transient $R_2$ caused by the voltage peak $X_2$ of curve $K_4$ then unavoidably has a negative sign or polarity, but on the other hand it is considerably lower than the first transient $R_1$, since the voltage peak $X_2$ is much lower than the voltage peak $X_1$. In spite of the lower voltage of the transient $R_2$, it is still too high to be accepted by the electronic components and its energy must therefore be neutralized. This neutralization is done in the varistor 18 which will carry increased current for a pre-determined voltage so that the circuit with the charging coil 11 and the varistor 18 will carry current. The varistor 18 functions then as a resistance, which absorbs energy from the transients $R_2$ while generating a certain amount of heat.

If the transients $R_1$, $R_2$ were reversed in direction so that the transient $R_1$ were negative and the transient $R_2$ were positive, the varistor 18 would quickly cease to function due to excessive heat generation. The first-stated transient signs are therefore the only ones possible, given the requirements of small and cheap electronic components, such requirements always being present in ignition systems of this kind.

Subsequent transients in the curve $K_5$, e.g. a transient $R_3$, which as a result of the dampened voltage cycle get smaller and smaller values, will follow the same laws as have been accounted for with respect to the transients $R_1$ and $R_2$.

The following summary applies for this arrangement, starting with the premise that the ignition coil sparking must be negative:

(a) The voltages induced in the primary and secondary windings 6, 7 of the ignition coil 5 due to the transient magnetic field caused by capacitor discharge shall be so orientated that the two lower voltage peaks $V_9$, FIG. 4 curve $K_{2'}$ will be negative, with an allowable peak voltage of at most about 2 KV, while the intermediate voltage peak $V_8$ will in consequence hereof be positive and have a maximum value of 4.5 to 5 KV.

(b) The first transient $R_1$, curve $K_5$ of FIG. 5, induced in the charging coil 11 as a result of the magnetic coupling between the coil 11 and the ignition coil 5, shall have positive direction, and the second lower transient $R_2$ shall have a negative direction.

(c) Energy from the second negative transient $R_2$ must be eliminated so as not to damage the electronic components in the system.

The problems set forth under (a) and (b) are solved, with due regard for appropriate physical laws for magnetic field directions and voltages induced therefrom, in such a way that the primary winding 6 and secondary winding 7 of the ignition coil 5 and the charging coil winding 11 are all wound in the same winding sense as shown by the arrows P7, P8 and P9, FIG. 6.

The number of winding turns for the ignition coil must be selected, in view of the stated requirements for the peak voltages, to provide a turn ratio suitable to the system, for example a primary to secondary ratio between 1:75 and 1:150, preferably in the range of 1:80 to 1:108. One example would be:

primary winding: 70±5 turns secondary winding: 6000 to 7000 turns

The problem under (c) is solved by shunt coupling the varistor 18 across the charging coil 11.

Figure 7:
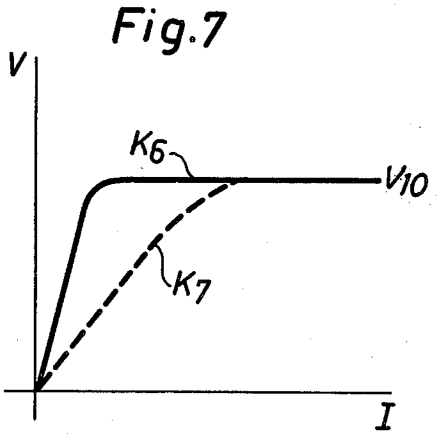
FIG. 7 is a diagram showing characteristic function graphs for two different types of varistors.

The market offers two basic types of varistors, one based on metal oxide and the other on silicon carbide, of which the first-mentioned is preferred for the system described. In the diagram according to FIG. 7 the difference between the two varistor types is shown schematically, a full-line curve $K_6$ denoting the current passage through a varistor of the metal oxide type, and a dashed curve $K_7$ showing a corresponding passage through a varistor of the silicon carbide type. As shown in FIG. 7 at one and the same voltage $V_{10}$, the current passage through a metal oxide varistor according to the curve $K_6$ is considerably greater than for a silicon carbide varistor according to the curve $K_7$. This relationship is of the great importance in the described system, where energy is absorbed from the negative transient $R_2$, FIG. 5 for eliminating all risk of damaging effects on the electronic components.

The realities, electrical functions and problem solutions accounted for in the description are based on extremely deep laboratory investigations and tests on completely engineered magneto apparatuses. The voltage sequence set forth in graph in FIGS. 4 and 5 constitute faithful reproductions of a number of photographed oscillograms. Extensive practical trials have also demonstrated the great operational capacity and reliability of the system.

What is claimed is:

1. An electronic ignition system for use on an internal combustion engine having a spark plug and a flywheel magnet, comprising:

(a) a core having three legs integral with each other and thus magnetically coupled to each other for coacting with at least one pair of passing magnetic poles of the magnet; and (b) an ignition circuit including (1) a trigger coil carried on a first one of said legs;

(2) circuit closing means having a control electrode to which said trigger coil is connected;

(3) an ignition coil carried on the middle one of said legs, and having primary and secondary windings, the latter being adapted to be connected to said spark plug;

(4) a charging coil carried by the third one of said legs;

(5) a charging rectifier and a storage capacitor connected in series between said charging coil and said primary winding;

(6) the charging coil, a primary of said ignition coil, and a secondary of said ignition coil having turns wound in the same sense of direction;

(7) the number of turns in said primary compared to the number of turns in said secondary having a ratio within the range of 1:75 to 1:150; and (8) said trigger coil being adapted to coact with said pair of magnet poles after the flywheel magnet has rotated over 180° past said charging coil, during which rotation said storage capacitor carries a charge;

whereby the dominant voltage in the ignition coil induced by transient oscillations occuring at sparking has a direction opposite to the spark-initiating voltage peak, and whereby the voltage dominating half-periods resulting from said transient oscillations go in a charging direction of said storage capacitor, and whereby said transient oscillations occur just before a full flux alternating sequence arises in said middle leg.

2. A system according to claim 1 including a metal oxide varistor shunt-coupled across the charging coil for reducing transient voltages, only in the inverse direction of the charging rectifier, whereby transient voltages in the direction of the charging rectifier add to the charge of the storage capacitor during its discharge.

3. A system according to claim 1, said ratio being in the range of 1:80 to 1:108.

4. A system according to claim 1 including a diode, said diode and said circuit closing means being connected (a) to a point between said charging rectifier and said storage capacitor, (b) in parallel to each other, and (c) across the serially connected charging coil and charging rectifier.

5. A system according to claim 1 including a resistor of selected size shunt-connected across only said trigger coil.

* * * * *